United States Patent
Kaczmar et al.

(10) Patent No.: US 10,677,140 B1
(45) Date of Patent: Jun. 9, 2020

(54) MULTI-PORT EXHAUST GAS DIVERTER VALVE FOR AN INTERNAL COMBUSTION ENGINE SYSTEM

(71) Applicant: GM Global Technology Operations LLC, Detroit, MI (US)

(72) Inventors: Michael Kaczmar, Farmington Hills, MI (US); Michael Smith, Clarkston, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 16/375,430

(22) Filed: Apr. 4, 2019

(51) Int. Cl.
| | |
|---|---|
| *F02D 41/00* | (2006.01) |
| *F16K 11/07* | (2006.01) |
| *F01L 7/02* | (2006.01) |
| *F01P 7/02* | (2006.01) |
| *F16K 11/074* | (2006.01) |

(52) U.S. Cl.
CPC .......... *F01P 7/026* (2013.01); *F02D 41/0002* (2013.01); *F16K 11/074* (2013.01); *B01D 2259/40005* (2013.01)

(58) Field of Classification Search
CPC .......... F02D 41/0077; F02D 9/04; F01L 7/02; F16K 31/5245
See application file for complete search history.

(56) References Cited

U.S. PATENT DOCUMENTS

| | | | | |
|---|---|---|---|---|
| 6,223,534 | B1* | 5/2001 | Erdmann | F02B 37/025 123/564 |
| 2010/0024414 | A1* | 2/2010 | Hittle | F02B 37/183 60/602 |
| 2017/0350312 | A1* | 12/2017 | Karstadt | F02B 37/22 |
| 2018/0340544 | A1* | 11/2018 | Hanna | F04D 27/0246 |

* cited by examiner

*Primary Examiner* — Long T Tran

(57) ABSTRACT

A multi-port exhaust gas diverter valve disposed within a linkage of an exhaust manifold for selectively diverting an exhaust gas generated by an internal combustion engine to one or more of a turbocharger system, an exhaust gas recirculation system, and an emissions control system. The diverter valve includes an inlet port for receiving an exhaust gas from the exhaust manifold and a plurality of outlet ports. A rotatable valve sleeve having an open end and a slot opening is co-axially disposed within a cylindrical chamber defined by the valve body. The open end of the valve sleeve is in continuous fluid communication with the inlet port. The valve sleeve is selectively rotatable to align the slot opening with at least one of the plurality of outlet ports such that the valve sleeve provides fluid communication between the inlet port and the at least one of the outlet ports.

20 Claims, 3 Drawing Sheets

MULTI-PORT EXHAUST GAS DIVERTER VALVE FOR AN INTERNAL COMBUSTION ENGINE SYSTEM

The present disclosure relates to a multi-port valve, more particularly to a multi-port exhaust gas diverter valve for an internal combustion engine system.

For fuel efficiency and emissions controls, modern internal combustion engines utilize turbocharger systems, exhaust gas recirculation (EGR) systems, and emissions control systems. A typical internal combustion engine includes an exhaust manifold having multiple exhaust gas valves positioned at strategic linkages of the exhaust manifold. At certain operating conditions of the internal combustion engine, various combinations of exhaust gas valves are selectively actuated to divert the hot exhaust gas generated by the internal combustion engine to one or more of the turbocharger system, EGR system, and emissions control system. Examples of exhaust gas valves include a turbocharger bypass valve, an EGR valve, and a turbine wastegate valve.

During cold start-up of the internal combustion engine, a selected first combination of exhaust gas valves are actuated to divert the hot exhaust gas to bypass the turbocharger system and EGR system to the emissions control system for enabling a more expedient light-off of the catalyst in the catalytic converter 136. Once the engine and catalyst are up to operating temperatures, and during periods of high torque output demand, a selected second combination of exhaust gas valves are actuated to divert the hot exhaust gas to the turbocharger system for increasing the torque output. At certain engine operating conditions, it is beneficial to recirculate a portion of the exhaust gas, known as Exhaust Gas Recirculation, by actuating a selected third combination of exhaust gas valves.

Internal combustion engine systems utilizing multiple exhaust gas valves can be costly and complex. Such engine systems require complicated exhaust gas linkages and associated fittings necessary to place the individual exhaust gas valves within their proper positions within the exhaust systems. The proper operation of the internal combustion engine systems depends on the careful coordination of the actuations of the multiple exhaust gas valves such that that the closing and opening of coordinated exhaust gas valves occur substantially simultaneously and smoothly. Otherwise, improper interruption in exhaust gas flow may result in undesirable pressure surges and/or drops through the exhaust systems, which could results in less than optimal performance of the internal combustion engines and associated systems.

Thus, while current internal combustion engine systems having multiple exhaust gas valves for diverting hot exhaust gas to various systems achieve their intended purpose, there is a need for a more eloquent engine system architecture having a single exhaust gas diverter valve that serves the functions of multiple exhaust gas valves.

SUMMARY

According to several aspects, a multi-port exhaust gas diverter valve is disclosed. The multi-port exhaust gas diverter valve includes a valve body having an interior surface defining a chamber, wherein the valve body include an inlet port in fluid communication with the chamber and a plurality of outlet ports in fluid communication with the chamber; and a valve element disposed within the chamber. The valve element includes an open end aligned with the inlet port and a slot opening. The valve element is selectively rotatable within the chamber to align the slot opening with at least one of the plurality of outlet ports such that the inlet port is fluid communication with the at least one of the outlet ports.

In an additional aspect of the present disclosure, the chamber is cylindrical chamber extending along a longitudinal axis. The valve element is a valve sleeve having an outer surface defining a cylindrical sleeve wall rotatably abutting a portion of the interior surface of the valve body defining the cylindrical chamber.

In another aspect of the present disclosure, the inlet port extends in an axial direction along the longitudinal axis; the plurality of outlet ports extend radially from the longitudinal axis; and the slot opening is defined in the cylindrical sleeve extending in a direction along the longitudinal axis.

In another aspect of the present disclosure, the multi-port exhaust gas diverter valve further includes an actuator stem rotationally fixed to the valve sleeve.

In another aspect of the present disclosure, the multi-port exhaust gas diverter valve further includes an electro-mechanical actuator coupled to the actuator stem for selectively rotating the actuator stem thus rotating the valve sleeve within the cylindrical chamber to align the slot opening with the at least one of the plurality of outlet ports.

In another aspect of the present disclosure, the plurality of outlet ports include two adjacent outlet ports located sufficiently close to each other and the slot opening is sufficiently wide such that the slot opening selectively overlaps the two adjacent outlet ports.

In another aspect of the present disclosure, the plurality of outlet ports include two adjacent outlet ports located sufficiently spaced from each other and the slot opening sufficiently narrow such that the slot opening cannot selectively overlaps the two adjacent outlet ports.

In another aspect of the present disclosure, the valve body includes a first end wall having an inlet defining the inlet port. The inlet is configured to be connectable to an exhaust header of an internal combustion engine.

In another aspect of the present disclosure, the valve body includes a first outlet defining a first outlet port, a second outlet defining a second outlet port, and a third outlet defining a third outlet port.

In another aspect of the present disclosure, the first outlet is configured to be connectable to a turbine, the second outlet is configured to be connectable to an EGR conduit, and the third outlet is configured to be connectable to an exhaust conduit.

According to several aspects, an engine system architecture is disclosed. The engine system architecture includes an internal combustion engine configured to generate an exhaust gas; an exhaust manifold for receiving the exhaust gas, wherein the exhaust manifold includes a plurality of exhaust runners extending from the engine converging into an exhaust header; and an exhaust gas valve having an inlet port in fluid communication with the exhaust manifold and a plurality of outlet ports. The exhaust gas valve is configured to selectively divert the exhaust gas to at least one of the plurality of outlet ports.

In an additional aspect of the present disclosure, the engine system architecture, further includes a turbocharger having a turbine; a turbine bypass conduit; and an exhaust gas recirculation conduit. The plurality of outlet ports include a first outlet port in fluid communication with the turbine, a second outlet port in fluid communication with the EGR conduit, and a third outlet port in fluid communication with the turbine bypass conduit.

In another aspect of the present disclosure, the inlet port of the exhaust gas valve is in fluid connection with the exhaust header such that the exhaust gas valve receives substantially all the exhaust gas conveyed by all the exhaust runners.

In another aspect of the present disclosure, the turbocharger is a fixed-geometry type turbocharger. The exhaust gas valve is configured to selectively divert the exhaust gas to the first outlet port, the second outlet port, and both the first outlet port and the second outlet port.

In another aspect of the present disclosure, the exhaust gas valve is further configured to selectively divert the exhaust gas to the second outlet port, the third outlet port, and between both the second outlet port and the third outlet port.

In another aspect of the present disclosure, the inlet port of the exhaust gas valve is in fluid connection with one of the exhaust runners such that the exhaust gas valve receives substantially all the exhaust gas conveyed by the one of the exhaust runners.

In another aspect of the present disclosure, the turbocharger is a variable-geometry type turbocharger. The exhaust gas valve is configured to selectively divert the exhaust gas to the first outlet port, the second outlet port, and the third outlet port.

According to several aspects, a multi-port diverter valve is disclosed. The multi-port diverter valve includes a valve body having an interior surface defining a cylindrical chamber along a longitudinal axis-A, wherein the valve body includes a first end wall and a second end wall spaced from the first end wall sealing opposite ends of the cylindrical chamber; an axial inlet extending from the first end wall defining an inlet port in fluid communication with the cylindrical chamber; a plurality of radial outlets extending from the valve body defining a plurality of outlet ports in fluid communication with the cylindrical chamber; and a valve sleeve co-axially disposed within the cylindrical chamber. The valve sleeve includes an open end in continuous fluid communication with the inlet port and a slot opening. The valve sleeve is rotatable about the longitudinal axis-A such that the slot opening is selectively aligned with at least one of the plurality of outlet ports thus providing fluid communication between inlet port and the least one of the plurality of outlet ports.

In an additional aspect of the present disclosure, the valve sleeve includes an inner surface facing the longitudinal axis-A and an opposite facing outer surface defining a cylindrical sleeve wall complementary in shape to a portion of the interior surface of the valve body defining the cylindrical chamber such that the cylindrical sleeve wall rotatably abuts the portion of the interior surface of valve body.

In another aspect of the present disclosure, the multi-port diverter valve further including an actuator stem rotationally fixed to an end portion of the valve sleeve and an actuator coupled to the actuator stem for selectively rotating the valve sleeve.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 2:
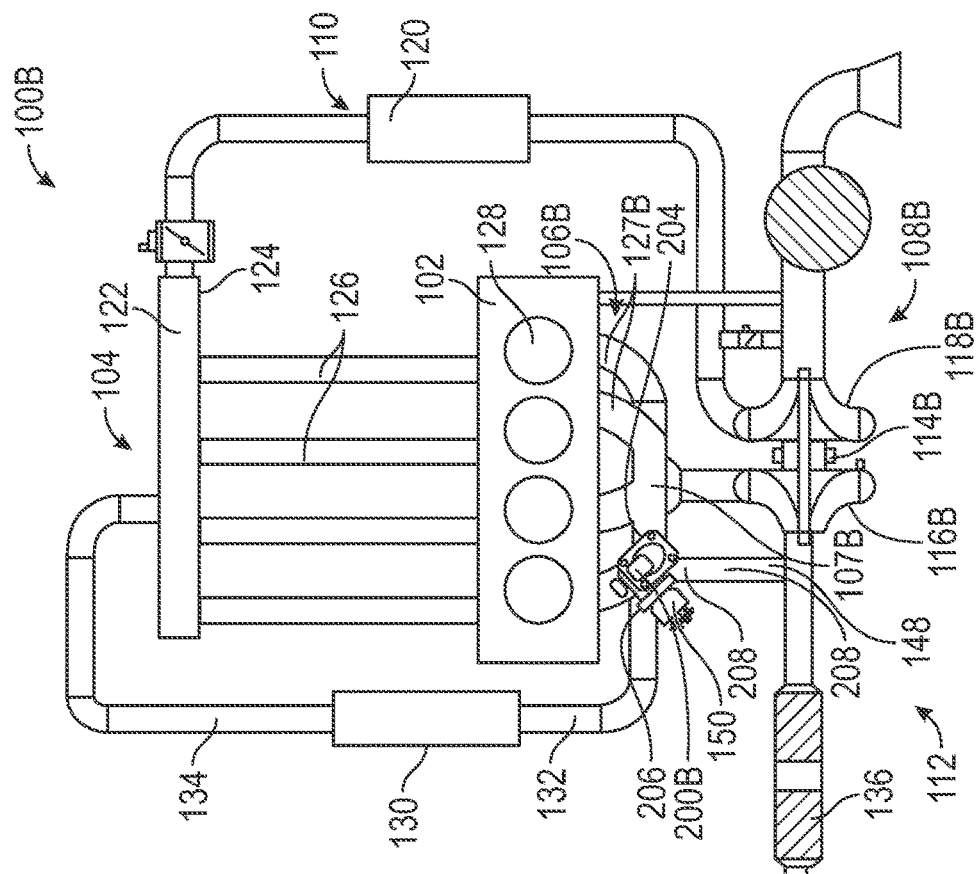
FIG. 2 is a schematic illustration of a second embodiment of a forced induction engine system having a second embodiment of a multi-port exhaust gas diverter valve.
Figure 1:
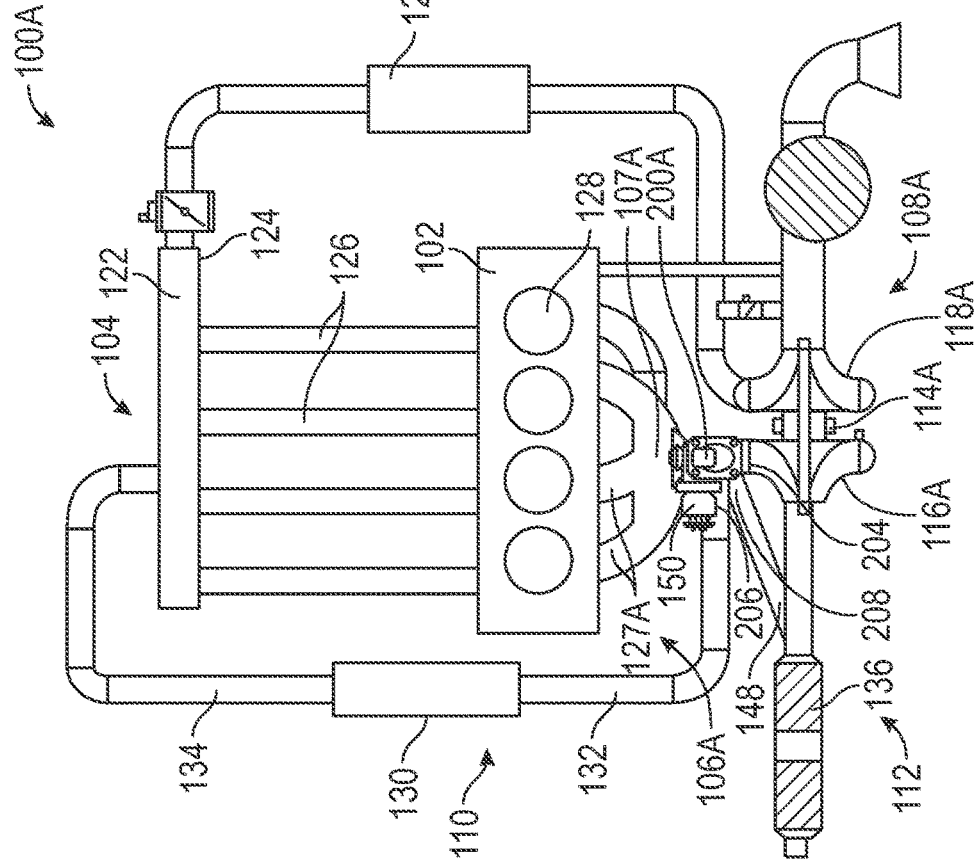
FIG. 1 is a schematic illustration of a first embodiment of a forced induction engine system having a first embodiment of a multi-port exhaust gas diverter valve.

Referring to both FIGS. 1 and 2, are schematic illustrations of two alternative embodiments of a forced induction internal combustion engine system architecture 100A, 100B. The engine system architecture 100A, 100B includes an internal combustion engine 102 having an intake manifold 104 and an exhaust manifold 106A, 106B, a turbocharger system 108A, 108B, an exhaust gas recirculation (EGR) system 110, and an emissions control system 112. A multi-port exhaust gas diverter valve 200A, 200B, also referred to as a multi-port exhaust valve 200A, 200B, is disposed within the respective exhaust manifolds 106A, 106B for selectively diverting an exhaust gas generated by the engine 102 to one or more of the turbocharger system 108A, 108B, exhaust gas recirculation (EGR) system 110, and the emissions control system 112.

The turbocharger system 108A, 108B includes a turbocharger 114A, 114B having a turbine 116A, 116B rotationally coupled to a compressor 118A, 118B and a charge air cooler 120. The turbine 116A, 116B is configured to receive a flow of hot exhaust gas from the exhaust manifold 106A, 106B to drive the compressor 118A, 118B. The compressor 118A, 118B is configured to compress an ambient airflow into a hot compressed airflow, which is then cooled by the charged air cooler 120 into a cooled compressed airflow. The cool compressed airflow is conveyed to the combustion chambers 128 of the engine 102 through the intake manifold 104.

The intake manifold 104 includes an intake manifold header 122 having an intake manifold inlet 124 for receiving the compressed cool airflow from the charged air cooler 120, and a plurality of intake manifold runners 126 for conveying the combustion air to a plurality of corresponding combustion chambers 128. Fuel may be supplied to the combustion air prior to or within the combustion chambers 128 to form an air/fuel mixture. While four intake manifold runners 126 and four corresponding combustion chambers 128 are shown, it should be appreciated that the engine 102 may include more or less manifold runners 126 and combustion chambers 128 without departing from the scope of the invention.

The exhaust gas recirculation (EGR) system 110 is utilize to recycle a portion of the exhaust gas from the engine 102 through an EGR cooler 130 to the intake manifold 104, thus allowing the cooled EGR gases to lower the combustion temperature and preventing pre-ignition of the air/fuel mixture in the combustion chambers 128. A lower combustion temperature also have the benefit of reducing undesirable emissions such as nitrous oxides (NOx). The EGR system 110 includes an upstream EGR duct 132 configured to convey a flow of hot exhaust gas from the exhaust manifold 106A, 106B to the EGR cooler 130, and a downstream EGR duct 134 configured to convey a flow of cooled exhaust gas from the EGR cooler 130 to the manifold header 122.

The emissions control system 112 includes a catalytic converter 136 having a catalyst (not shown) for converting undesirable pollutants in the exhaust gas into inert products, such as carbon dioxide and water vapor, by catalyzing an oxidation and reduction reaction. Catalytic converters 16 require a temperature of approximately 700 degrees Fahrenheit (371° C.) to efficiently convert the undesirable pollutants into the inert products. During cold engine 102 starts, it is desirable to divert a portion of the hot exhaust gas from the EGR system 110 and turbocharger system 108A, 108B to the emissions control system 112, specifically to the catalytic converter 136, to bring the catalyst to operating temperature, also refer to as catalyst light-off, for efficient operation of the emissions control system 112.

Referring to FIG. 1, the exhaust manifold 106A of the first embodiment of the combustion engine system architecture 100A includes a plurality of exhaust runners 127A extending from the engine 102. The plurality of exhaust runners 127A converge into an exhaust header 107A having a first embodiment of the multi-port exhaust valve 200A. The multi-port exhaust valve 200A includes three outlets 204, 206, 208. The first outlet 204 is in fluid communication with the turbine 116A, the second outlet 206 is fluid communication with the EGR duct 132 which connects to the intake side of the engine 102, and the third outlet 208 is in fluid communication with the turbine bypass conduit 148. The turbine bypass conduit 148 conveys the hot exhaust gas from the third outlet 208 to an exhaust conduit upstream of the catalytic converter 136. The multi-port exhaust valve 200A is configured to selectively divert the exhaust gas from the exhaust header 107A to one of the first outlet 204; the second outlet 206; the third outlet 208; divided between the first outlet 204 and the second outlet 206; and divided between the second outlet 206 and the third outlet 208.

An electric-mechanical valve actuator 150 is provided to receive a signal from a controller (not shown) to actuate the multi-port exhaust valve 200A based on predetermined engine operating conditions. For example, at cold startup of the engine 102, the multi-port exhaust valve diverts substantially all of the exhaust gas from the exhaust manifold 106A to the exhaust conduit upstream of the catalytic converter 136. During EGR mode, the hot exhaust gas may be diverted to the upstream EGR duct or divided between the upstream EGR duct 132 and the catalytic converter 136. During periods of increased torque output demand, substantially all the hot exhaust gas may be diverted to the turbine 116A or divided between the turbine 116A and the catalytic converter 136.

The turbocharger 114A is a fixed-geometry type turbocharger, meaning that the turbine 116A and compressor 118A geometries are fixed and the boost pressure is entirely determined by the exhaust flow received by the turbine 116A. The fixed geometry turbocharger does not have a waste gate, but instead relies on the multi-port exhaust valve 200A for controlling the boost by controlling the amount of gas diverted to turbine 116A. The use of a fixed geometry turbocharger 114A allows for a less expensive and simpler turbocharger design.

Referring to FIG. 2, the exhaust manifold 106B of the second embodiment of the combustion engine system architecture 100B includes a plurality of exhaust runners 127B extending from the engine 102. The plurality of exhaust runners 127B merge into an exhaust header 107B. The exhaust header 107B includes an outlet that directs the hot exhaust gas to the turbine 116B. A second embodiment of the multi-port exhaust valve 200B is disposed at junction between one of the exhaust runners 127B and the exhaust header 107B.

The multi-port exhaust valve 200B is configured to receive the exhaust gas from the one exhaust runner 127B. The multi-port exhaust valve 200B is further configured to selectively divert the exhaust gas from the one exhaust runner 127 to one of a first outlet 204, a second outlet 206, and a third outlet 208. The first outlet 204 is connected to the exhaust header 107B in fluid communication with the turbine 116B, the second outlet 206 is connected to the upstream EGR duct 132, and the third outlet 208 is connected to a turbine bypass conduit 148. The turbine bypass conduit 148 conveys the hot exhaust gas from the third outlet 208 to an exhaust conduit upstream of the catalytic converter 136.

An electronic actuator 150 is provided to receive a signal from a controller (not shown) to actual the multi-port exhaust valve based on predetermined engine operating conditions. At cold startup of the engine 102, the multi-port exhaust valve 200B diverts substantially all of the exhaust gas from the one exhaust runner 127B to the catalytic converter 136. During EGR mode or single cylinder fed EGR mode, the multi-port exhaust valve 200B diverts substantially all of the hot exhaust gas from the one exhaust runner 127 to the inlet EGR duct 132. During periods of increased torque output demand, substantially all of the exhaust gas from the one exhaust runner 127 is diverted to the exhaust header 107B contributing to the hot exhaust gas supplied to the turbine 116B.

In this embodiment, the turbocharger 114B is a variable-geometry type turbocharger having a ring of selectively moveable vanes (not shown) to control the compression of the intake air. The vanes may be controlled by an actuator including, but not limited to, a membrane vacuum actuator, an electric servo actuation, a 3-phase electric actuation, a hydraulic actuator, and/or an air actuator.

Figure 3:
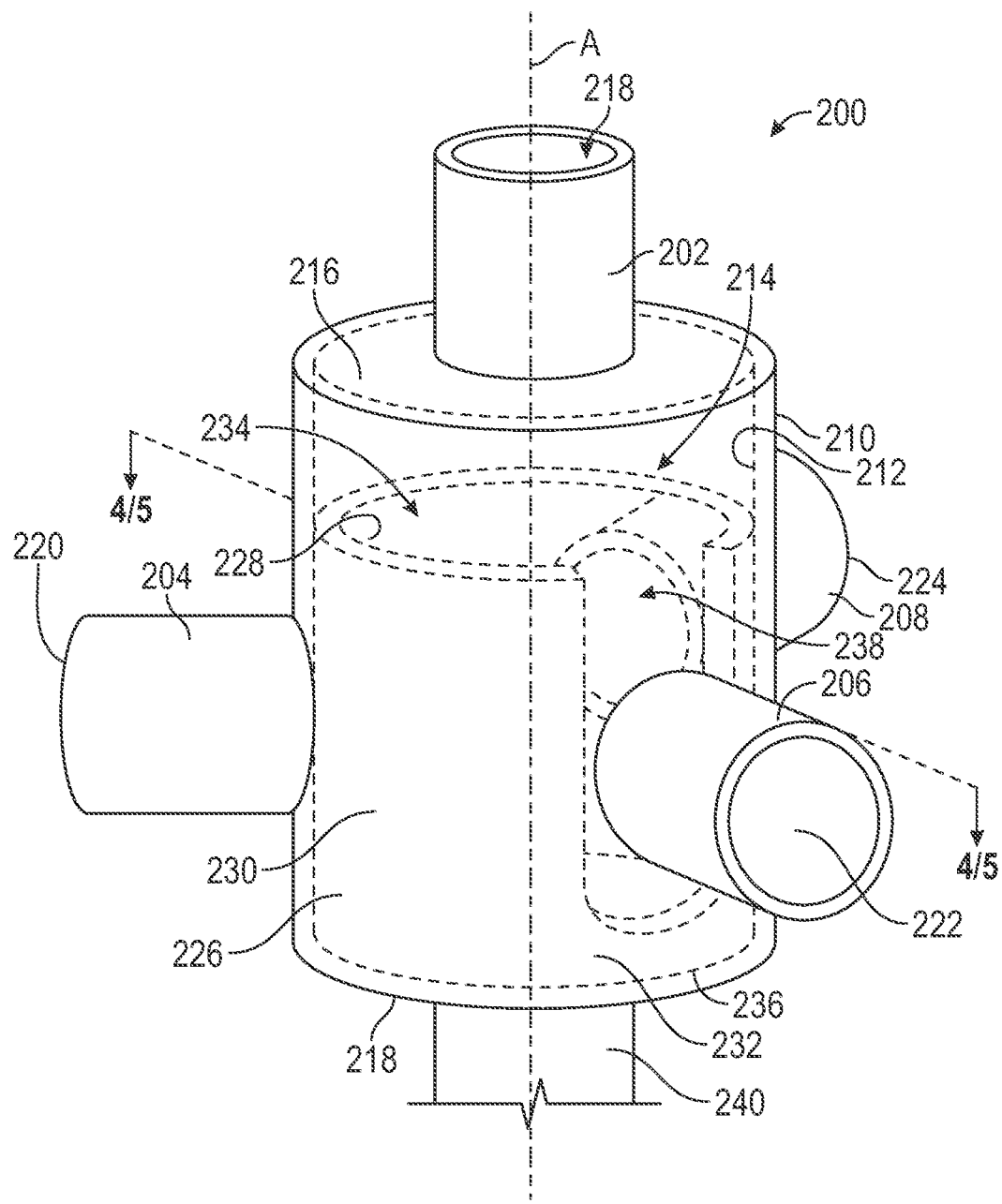
FIG. 3 is a diagrammatic illustration of a perspective view of a multi-port exhaust gas diverter valve, according to an exemplary embodiment.

FIG. 3 shows an exemplary embodiment of a multi-port exhaust valve 200 having an axial inlet 202 and a plurality of radial outlets 204, 206, 208. The multi-port exhaust valve includes a valve body 210 having an interior surface 212 defining a cylindrical chamber 214 along a longitudinal axis-A. The valve body 210 includes a first end wall 216 and a second end wall 218 spaced from the first end wall 216 sealing the opposite ends of the cylindrical chamber 214. The axial inlet 202 extends from the first end wall 216 defining an inlet port 219 in fluid communication with the cylindrical chamber 214. The plurality of radial outlets 204, 206, 208 includes a first outlet 204, a second outlet 206, and a third outlet 208 extending from the valve body 210 defining a first outlet port 220, a second outlet port 222, and a third outlet port 224, respectively, in fluid communication with the cylindrical chamber 214. The first outlet 204 may be configured to be coupled to the exhaust header 107 leading to the turbine 116 or directly to the turbine 116, the second outlet 206 may be configured to be coupled to the upstream EGR duct 132, and the third outlet 208 may be configured to be coupled to a turbine bypass conduit 148 of the engine system architecture 100A, 100B shown in FIGS. 1 and 2.

The multi-port exhaust valve 200 further includes a valve element 226, known referred to as a valve sleeve 226, co-axially disposed within the cylindrical chamber 214. The valve sleeve 226 includes an inner surface 228 facing the longitudinal axis-A and an opposite facing outer surface 230 defining a cylindrical sleeve wall 232. The cylindrical sleeve wall 232 is complementary in shape to a portion of the interior surface 212 of the valve body 210 defining the cylindrical chamber 214 such that the cylindrical sleeve wall 232 rotatably abuts the portion of the interior surface 212.

In the embodiment shown, the valve sleeve 226 includes an open end 234 oriented toward the inlet port 219 and in continuous fluid communication with the inlet port 219, an opposite end portion 236 adjacent the second end wall 218 of the valve body 210, and an axially extending slot opening 238. An actuator stem 240 extends through the second end wall 218 of the valve body 210 and rotationally fixed to the end portion 236 of the valve sleeve 226. It is preferable that the actuator stem 240 is coaxially disposed with the valve sleeve 226.

An electro-mechanical actuator 150, best shown in FIGS. 1 and 2, may be coupled to the actuator stem 240 for selectively rotating the actuator stem 240 thus rotating the valve sleeve 226 within the cylindrical chamber 214 to align the slot opening 238 with one of the output ports 220, 222, 226 to provide fluid communication between the inlet port 219 and the one of the outlet ports 220, 222, 226.

Figure 4A:
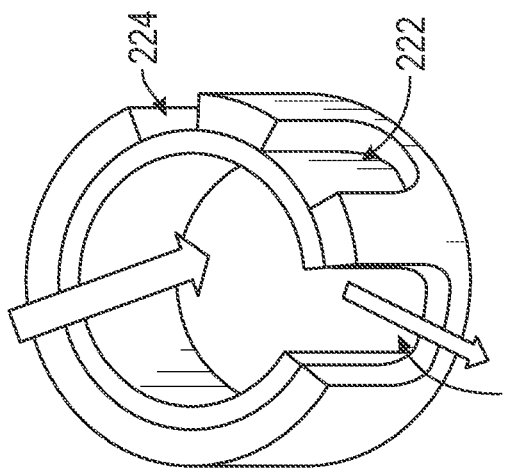
FIGS. 4A through 4C are diagrammatic illustrations of a cut-away perspective view of the first embodiment of the multi-port exhaust gas diverter valve.
Figure 4B:
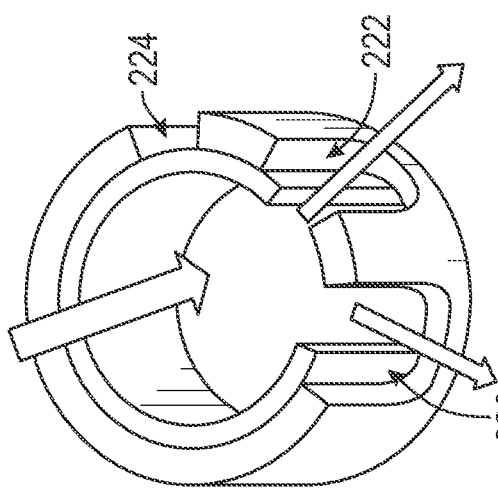
Figure 4C:
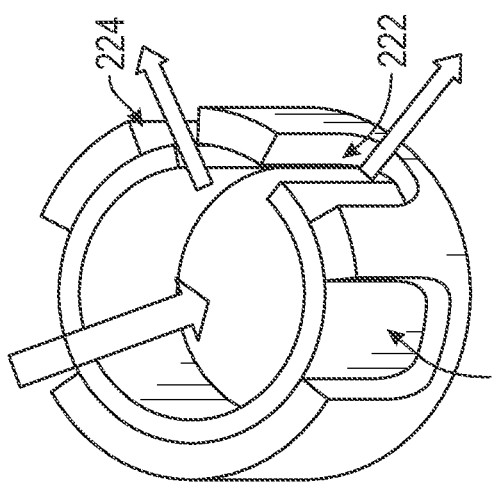

FIG. 4A through FIG. 4C are cut-away perspective views of the first embodiment of the multi-port exhaust gas valve 200A across plane P of FIG. 3. For clarity of illustration, the radial extending outlets 204, 206, 208 are removed from the valve body 210. In this embodiment, the valve body 210 includes two adjacent radial outlet ports 222, 224 located sufficiently close to each other and the slot opening 238 is sufficiently wide such the valve sleeve 226 may be rotatably positioned such that the slot opening 238 overlaps the two adjacent outlet ports 222, 224. The slot opening 238 overlapping of the two adjacent outlet ports 222, 224 enables the exhaust gas to be divided between the two adjacent outlet ports 222, 224. In the configuration shown in FIG. 4A, the exhaust gas axially enters the cylindrical chamber 214 and exits both the second outlet port 222 and the third outlet port 224. In the configuration shown in FIG. 4B, the exhaust gas axially enters the cylindrical chamber 214 and exits both the first outlet port 220 and the second outlet port 222. In the configuration shown in FIG. 4C, the slot opening 238 is aligned with only the first outlet port 220, such that the exhaust gas is diverted to the first outlet port 220 only. It should be appreciated that the slot opening 238 may also be selectively aligned with only the second outlet port 222 or with only the third outlet port 224.

Figure 5A:
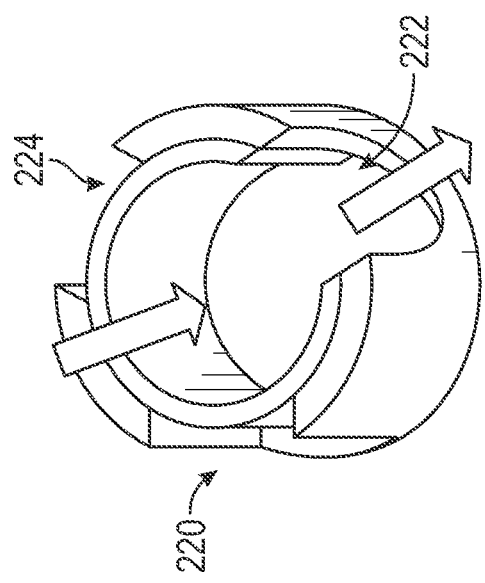
FIGS. 5A through 5C are diagrammatic illustrations of a cut-away perspective view of the second embodiment of the multi-port exhaust gas diverter valve.
Figure 5B:
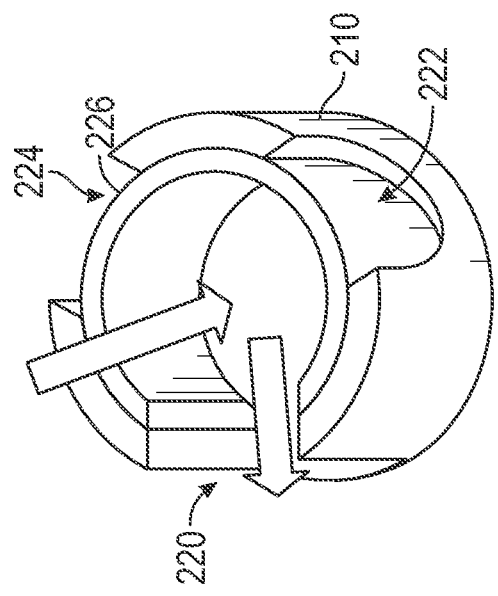
Figure 5C:
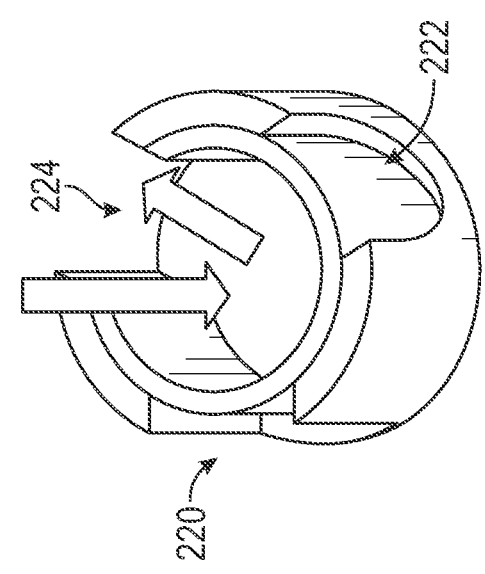

FIG. 5A through FIG. 5C are cut-away perspective views of the second embodiment of the multi-port exhaust gas valve 200B. In this second embodiment of the multi-port exhaust valve 200B, the outlet ports 220, 222, 224 are substantially equally spaced about the longitudinal axis-A and the slot opening 238 of the valve sleeve 226 is alignable with only one outlet port 220, 222, 224 at a time. In other words, the exhaust gas is only directed to one outlet port at a time and is not simultaneously divided between two outlet ports.

FIG. 5A shows the valve sleeve 226 having the slot opening 238 aligned with the third outlet port 224. In this configuration, the exhaust gas axially enters the cylindrical chamber 214 and exits the third outlet port 224. FIG. 5B shows the slot opening 238 aligned with the first outlet port 220. In this configuration, the exhaust gas axially enters the cylindrical chamber 214 through the inlet port 219 and exits the first outlet port 220. FIG. 5C shows the slot opening 238 aligned with the second outlet port 222. In this configuration, the exhaust gas axially enters the cylindrical chamber 214 and exits the second outlet port 222. In each of these configurations, the exhaust gas axially enters the cylindrical chamber 214 and exits a discrete outlet port 220, 222, 224 and is not divided between two or more outlet ports. The first outlet port 220 may connected to the turbine 116A, 116B, the second outlet port 222 may be connected to the EGR conduit 132, and the third outlet port 226 may be connected to the exhaust bypass conduit 148.

The above disclosure provides for a more eloquent engine system architecture that utilizes a single exhaust gas diverter valve that serves the functions of multiple exhaust gas valves. The above disclosure also provides for a multi-port exhaust gas diverter valve configured to selectively divert the exhaust gas from an exhaust header to a first outlet 204; a second outlet 206; a third outlet 208; divided between the first outlet 204 and the second outlet 206; and divided between the second outlet 206 and the third outlet 208.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A multi-port exhaust gas diverter valve, comprising:
   a valve body having an interior surface defining a chamber,
   wherein the valve body include an inlet port in fluid communication with the chamber and a plurality of outlet ports in fluid communication with the chamber; and
   a valve element disposed within the chamber, wherein the valve element includes an open end aligned with the inlet port and a slot opening;
   wherein the valve element is selectively rotatable within the chamber to align the slot opening with at least one of the plurality of outlet ports such that the inlet port is fluid communication with the at least one of the plurality of outlet ports.

2. The multi-port exhaust gas diverter valve of claim 1, wherein:
   the chamber defined by the interior surface of the valve body is a cylindrical chamber extending along a longitudinal axis; and
   the valve element is a valve sleeve having an outer surface defining a cylindrical sleeve wall rotatably abutting a portion of the interior surface of the valve body defining the cylindrical chamber.

3. The multi-port exhaust gas diverter valve of claim 2, wherein:
   the inlet port extends in a direction along the longitudinal axis;
   the plurality of outlet ports extend radially from the longitudinal axis; and
   the slot opening is defined in the cylindrical sleeve wall extending in a direction along the longitudinal axis.

4. The multi-port exhaust gas diverter valve of claim 3, further comprises an actuator stem rotationally fixed to the valve sleeve.

5. The multi-port exhaust gas diverter valve of claim 4, further comprises an electro-mechanical actuator coupled to the actuator stem for selectively rotating the actuator stem thus rotating the valve sleeve within the cylindrical chamber to align the slot opening with the at least one of the plurality of outlet ports.

6. The multi-port exhaust gas diverter valve of claim 5, wherein the plurality of outlet ports include two adjacent outlet ports located sufficiently close to each other and the slot opening is sufficiently wide such that the slot opening selectively overlaps the two adjacent outlet ports.

7. The multi-port exhaust gas diverter valve of claim 5, where the plurality of outlet ports include two adjacent outlet ports located sufficiently spaced from each other and the slot opening is sufficiently narrow such that the slot opening cannot selectively overlaps the two adjacent outlet ports.

8. The multi-port exhaust gas diverter valve of claim 4, wherein the valve body includes a first end wall having an inlet defining the inlet port, wherein the inlet is configured to be connectable to an exhaust header of an internal combustion engine.

9. The multi-port exhaust gas diverter valve of claim 8, wherein the valve body includes a first outlet defining a first outlet port, a second outlet defining a second outlet port, and a third outlet defining a third outlet port.

10. The multi-port exhaust gas diverter valve of claim 9, wherein the first outlet is configured to be connectable to a turbine, the second outlet is configured to be connectable to an EGR conduit, and the third outlet is configured to be connectable to an exhaust conduit.

11. An engine system architecture, comprising:
an internal combustion engine configured to generate an exhaust gas;
an exhaust manifold having a plurality of exhaust runners configured to convey the exhaust gas from the internal combustion engine, wherein the plurality of exhaust runners converges into an exhaust header; and
an exhaust gas valve having an inlet port in fluid communication with the exhaust manifold and a plurality of outlet ports, wherein the exhaust gas valve is configured to selectively divert the exhaust gas to at least one of the plurality of outlet ports.

12. The engine system architecture of claim 11, further comprising:
a turbocharger having a turbine;
a turbine bypass conduit; and
an exhaust gas recirculation (EGR) conduit;
wherein the plurality of outlet ports include a first outlet port in fluid communication with the turbine, a second outlet port in fluid communication with the EGR conduit, and a third outlet port in fluid communication with the turbine bypass conduit.

13. The engine system architecture of claim 12, wherein the inlet port of the exhaust gas valve is in fluid connection with the exhaust header such that the exhaust gas valve receives substantially all the exhaust gas conveyed by all the plurality of exhaust runners.

14. The engine system architecture of claim 13, wherein:
the turbocharger is a fixed-geometry type turbocharger; and
the exhaust gas valve is configured to selectively divert the exhaust gas to the first outlet port, the second outlet port, and both the first outlet port and the second outlet port.

15. The engine system architecture of claim 14, wherein:
the exhaust gas valve is further configured to selectively divert the exhaust gas to the third outlet port and between both the second outlet port and the third outlet port.

16. The engine system architecture of claim 12, wherein the inlet port of the exhaust gas valve is in fluid connection with one of the exhaust runners such that the exhaust gas valve receives substantially all the exhaust gas conveyed by the one of the exhaust runners.

17. The engine system architecture of claim 16, wherein:
the turbocharger is a variable-geometry type turbocharger; and
the exhaust gas valve is configured to selectively divert the exhaust gas to one of the first outlet port, the second outlet port, and the third outlet port.

18. A multi-port diverter valve, comprising:
a valve body having an interior surface defining a cylindrical chamber along a longitudinal axis-A, wherein the valve body includes a first end wall and a second end wall spaced from the first end wall;
an axial inlet extending from the first end wall defining an inlet port in fluid communication with the cylindrical chamber;
a plurality of radial outlets extending from the valve body defining a plurality of outlet ports in fluid communication with the cylindrical chamber; and
a valve sleeve co-axially disposed within the cylindrical chamber;
wherein the valve sleeve includes an open end in continuous fluid communication with the inlet port and a slot opening, and
wherein the valve sleeve is rotatable about the longitudinal axis-A such that the slot opening is selectively aligned with at least one of the plurality of outlet ports thus providing fluid communication between inlet port and the least one of the plurality of outlet ports.

19. The multi-port diverter valve of claim 18, wherein the valve sleeve includes an inner surface facing the longitudinal axis-A and an opposite facing outer surface defining a cylindrical sleeve wall complementary in shape to a portion of the interior surface of the valve body defining the cylindrical chamber such that the cylindrical sleeve wall rotatably abuts the portion of the interior surface of valve body.

20. The multi-port diverter valve of claim 18, further comprising:
an actuator stem rotationally fixed to an end portion of the valve sleeve; and
an actuator coupled to the actuator stem for selectively rotating the valve sleeve.

* * * * *